US012600607B2

(12) United States Patent
Rossato

(10) Patent No.: US 12,600,607 B2
(45) Date of Patent: Apr. 14, 2026

(54) VERTICAL HANDLING PLATFORM FOR MOTOR VEHICLES

(71) Applicant: O.ME.R. S.p.A., Mirano (IT)

(72) Inventor: Orietta Rossato, Mirano (IT)

(73) Assignee: O.ME.R. S.P.A., Mirano (IT)

( * ) Notice: Subject to any disclaimer, the term of this patent is extended or adjusted under 35 U.S.C. 154(b) by 91 days.

(21) Appl. No.: 18/293,384

(22) PCT Filed: Jul. 27, 2022

(86) PCT No.: PCT/IB2022/056925
§ 371 (c)(1),
(2) Date: Jan. 30, 2024

(87) PCT Pub. No.: WO2023/012596
PCT Pub. Date: Feb. 9, 2023

(65) Prior Publication Data

US 2025/0122055 A1 Apr. 17, 2025

(30) Foreign Application Priority Data

Aug. 3, 2021 (IT) ........................ 102021000020900

(51) Int. Cl.
*B66F 7/04* (2006.01)

(52) U.S. Cl.
CPC ............ *B66F 7/04* (2013.01); *B66F 2700/12* (2013.01)

(58) Field of Classification Search
None
See application file for complete search history.

(56) References Cited

U.S. PATENT DOCUMENTS

2022/0213710 A1 7/2022 Fäßler et al.

FOREIGN PATENT DOCUMENTS

| | | | | | |
|---|---|---|---|---|---|
| CN | 106185692 A | * | 12/2016 | | B66F 7/04 |
| CN | 110282573 A | * | 9/2019 | | B65F 9/00 |
| CN | 115028105 A | * | 9/2022 | | B66F 7/02 |
| DE | 202019102585 U1 | | 8/2020 | | |
| EP | 0381484 A1 | | 8/1990 | | |
| EP | 1473269 A1 | | 11/2004 | | |
| FR | 2823735 A1 | | 10/2002 | | |
| KR | 200177136 Y1 | * | 4/2000 | | B66F 17/00 |
| WO | WO-2006128241 A1 | * | 12/2006 | | E04H 5/06 |

OTHER PUBLICATIONS

Machien Translation of CN 110282573.*

* cited by examiner

*Primary Examiner* — Diem M Tran
(74) *Attorney, Agent, or Firm* — Carmel Patent Agency; Robert Ballarini

(57) ABSTRACT

A lifting platform for motor vehicles includes: a platform for receiving a motor vehicle; at least one actuator mounted on the platform; at least two pairs of flexible traction elements, constrained with one end to fixed points and configured to be subjected to traction by the at least one actuator and thus cause the lifting of the platform; return means of the flexible traction elements and a carriage, stably attached to the at least one actuator and sliding along longitudinal rails, which are fixed to the platform and are constituted by metal guide profiles of rollers, mounted idle on the carriage, or by runners. The profiles are provided with a horizontal sliding wing of the rollers or shoes, presenting openings for engagement of locking devices applied to the carriage itself, to which the other end of the flexible traction elements is stably fixed.

16 Claims, 7 Drawing Sheets

VERTICAL HANDLING PLATFORM FOR MOTOR VEHICLES

FIELD OF THE INVENTION

The present invention relates to a vertical handling platform for motor vehicles.

BACKGROUND

Platforms used in public or private car parks for lifting motor vehicles are known. They generally comprise a platform, on which the vehicle to be moved vertically is raised, and a movement system comprising one or more actuators, generally of the hydraulic or electromechanical type, a plurality of chains or other flexible traction elements, variously arranged and cooperating with each other, and synchronization members of the movements of said flexible elements to maintain the horizontality of the platform during its vertical movement even in the event of an unbalanced load.

A known type of platform comprises a single hydraulic actuator arranged vertically in the center of a smaller side of the platform and having the piston rod protruding upwards. The shorter side of the platform is constrained to the end of the rod either directly or through a chain or cable return, which is constrained with one end to the center of the shorter side of the platform and with the other end to the ground and is returned by a pinion or a pulley placed at the upper end of the rod.

The shorter side of the platform is kept in position by means of a carriage sliding along a vertical structure anchored to a wall and to the ground. As an alternative to these solutions, it is also known to use a multi-stage telescopic actuator.

In these known solutions the vertical translational motion of the platform is obtained with a pair of chains (or cables or ropes), which are fixed with the ends at fixed points at the lower and upper level of the vertical run of the platform, run along the longitudinal sides of the platform and are returned by pinions (or pulleys) constrained to the platform at the ends of its two major sides. Each chain is arranged so as to have a first vertical section running from a fixed point lower than a pinion, a second section running horizontally from one pinion to the other pinion located on the same side of the platform, and a third section running from the other pinion to a higher fixed point. Furthermore, the pinions of at least one pair of corresponding pinions located on the two sides of the platform are made integral with each other in rotation by a transverse bar.

The drawback of these lifting platforms consists in the overall dimensions of the lifting actuator, which, being located in a central position with respect to a smaller side of the platform, constitutes an obstacle to the passage of a car under the raised platform and does not allow free access to the platform space under the raised platform in the case of multiple rows of platforms.

Another known solution differs from the previous one in using two hydraulic actuators placed vertically in correspondence with vertical guide columns of the platform in its vertical movements. This is a solution that on the one hand eliminates the drawbacks of the previous one, because thanks to the position of the two actuators it does not involve any obstacle for accessibility in the area below the raised platform, but on the other hand it requires the use of two actuators and two guide columns and therefore complicates the construction of the platform and increases the related construction and maintenance costs.

Another known type of liftable platform provides for the use of two horizontal hydraulic actuators installed on the two sides of the platform and associated with respective chains conveyed vertically by synchronized pinions. Also in this case two other side chains, returned by synchronized pinions, ensure the horizontality of the platform during its vertical movements even in the event of an unbalanced load.

This known solution, described for example in WO 2020/224837, does not entail any obstacle for accessibility in the area below the raised platform, but has proved to be rather complex and expensive due to the need to use two hydraulic actuators and synchronization devices for the movements of the chains.

Another known solution uses a single hydraulic actuator arranged transversely to the ground within a platform and capable of operating four ropes which, through return pulleys, run first on the ground with a first section parallel to the transverse sides of the platform, then on the ground with a second section parallel to the longitudinal sides of the platform and finally with a third vertical section within vertical guide columns fixed to the floor in correspondence with the four vertices of the platform.

This solution also makes the space below the raised platform accessible but it is rather complex and cumbersome since, having to return the traction vehicles both horizontally and vertically, it cannot use chains but must use ropes or cables, which on one side they are subject to more important and differentiated elongations, which do not ensure the perfect horizontality of the platform in conditions of unbalanced load, and on the other hand for their transmissions they require pulleys, which are much more bulky than the pinions.

A similar solution, which also uses two longitudinally arranged hydraulic actuators is described in FR 2823735. It also provides that the traction means are returned both horizontally and vertically and therefore cannot consist of chains but only ropes or cables.

SUMMARY

The object of the invention is to propose a vertical movement platform for motor vehicles which is capable of eliminating all the drawbacks recognizable in traditional platforms.

In particular, the object of the invention is to provide a platform which makes the space below the raised platform always accessible.

Another object of the invention is to provide a platform which can use a single lifting actuator and which therefore is simple and economical to manufacture and safe and reliable in operation.

Another object of the invention is to provide a platform that can be moved with chains or ropes or cables or belts and essentially with any flexible traction means.

Another object of the invention is to provide a platform which, even without using synchronized pinions, ensures the vertical movement of the platform perfectly translating even in the presence of an unbalanced load.

Another object of the invention is to maximize the useful space of the platform.

Another object of the invention is to provide a platform which ensures the stability of the positioning of the platform at any height, regardless of possible losses of fluid due to leakage from the hydraulic circuit.

Another object of the invention is to provide a platform which ensures the maintenance of any vertical position of the platform, even in the event of accidental breakage of a chain.

Another object of the invention is to provide a platform which can also be installed without the use of vertical guide columns.

According to the invention, all these objects and others that will result from the following description are achieved jointly or separately with a vertical movement platform for motor vehicles as defined hereinbelow.

BRIEF DESCRIPTION OF THE DRAWINGS

The present invention is further clarified hereinafter in some of its preferred forms of practice. embodiments, reported for purely illustrative and non-limiting purposes with reference to the attached drawings, in which.

DETAILED DESCRIPTION OF THE PREFERRED EMBODIMENTS

Figure 1:
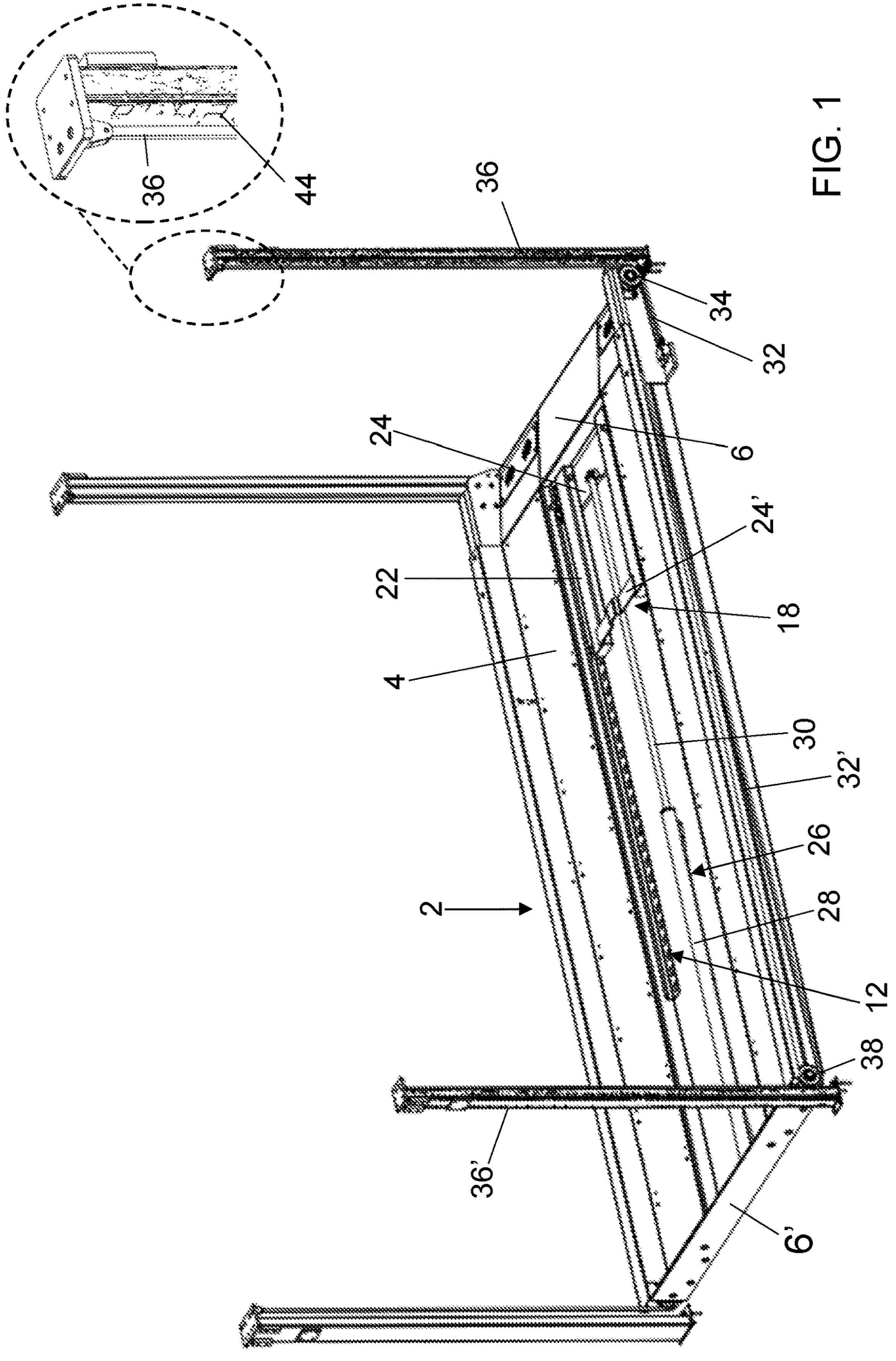
FIG. 1 shows a schematic perspective view of a vertical handling platform for motor vehicles according to the invention in the lowered condition.
Figure 2:
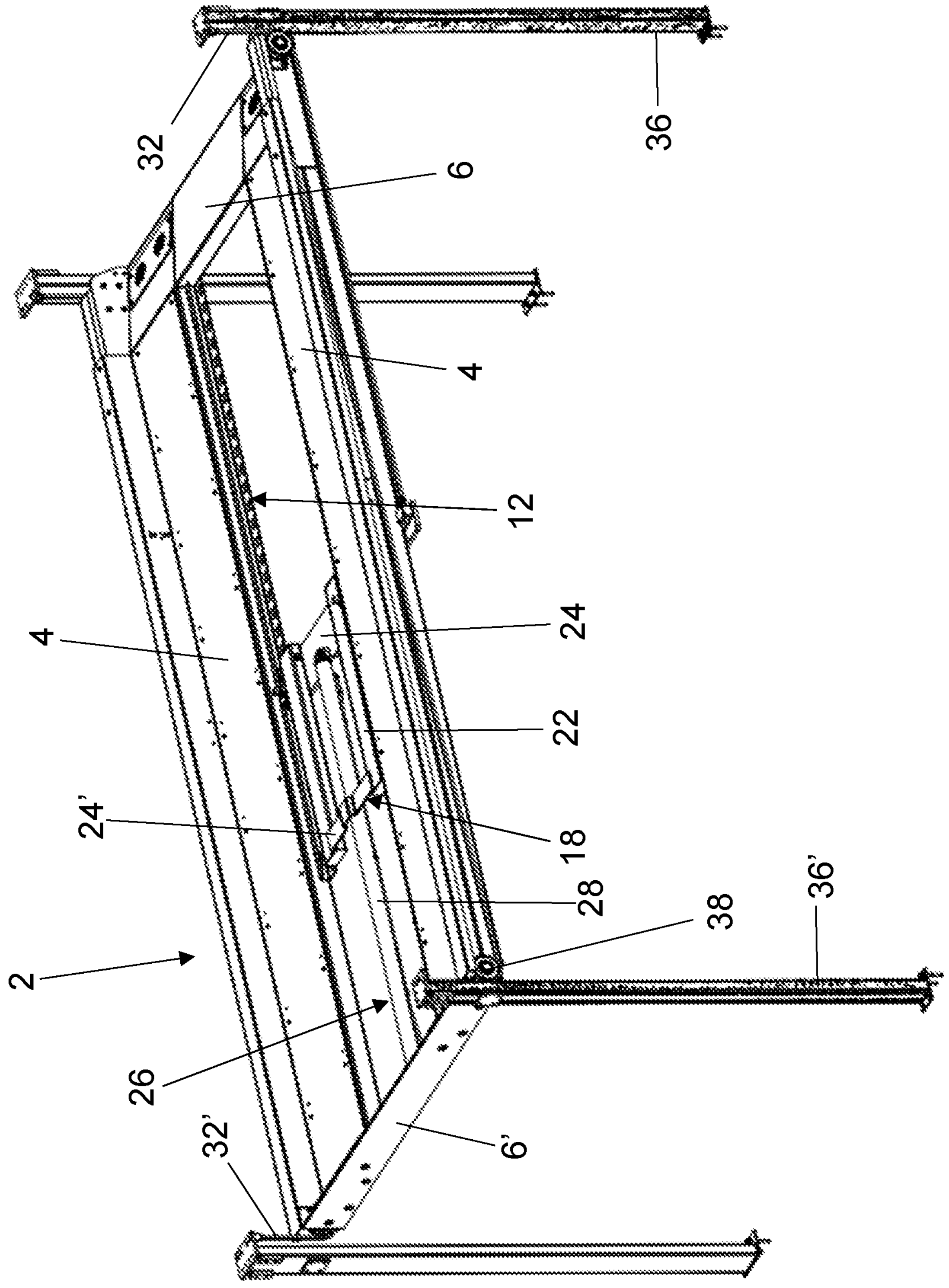
FIG. 2 shows in the same view of FIG. 1 but in raised condition.
Figure 3:
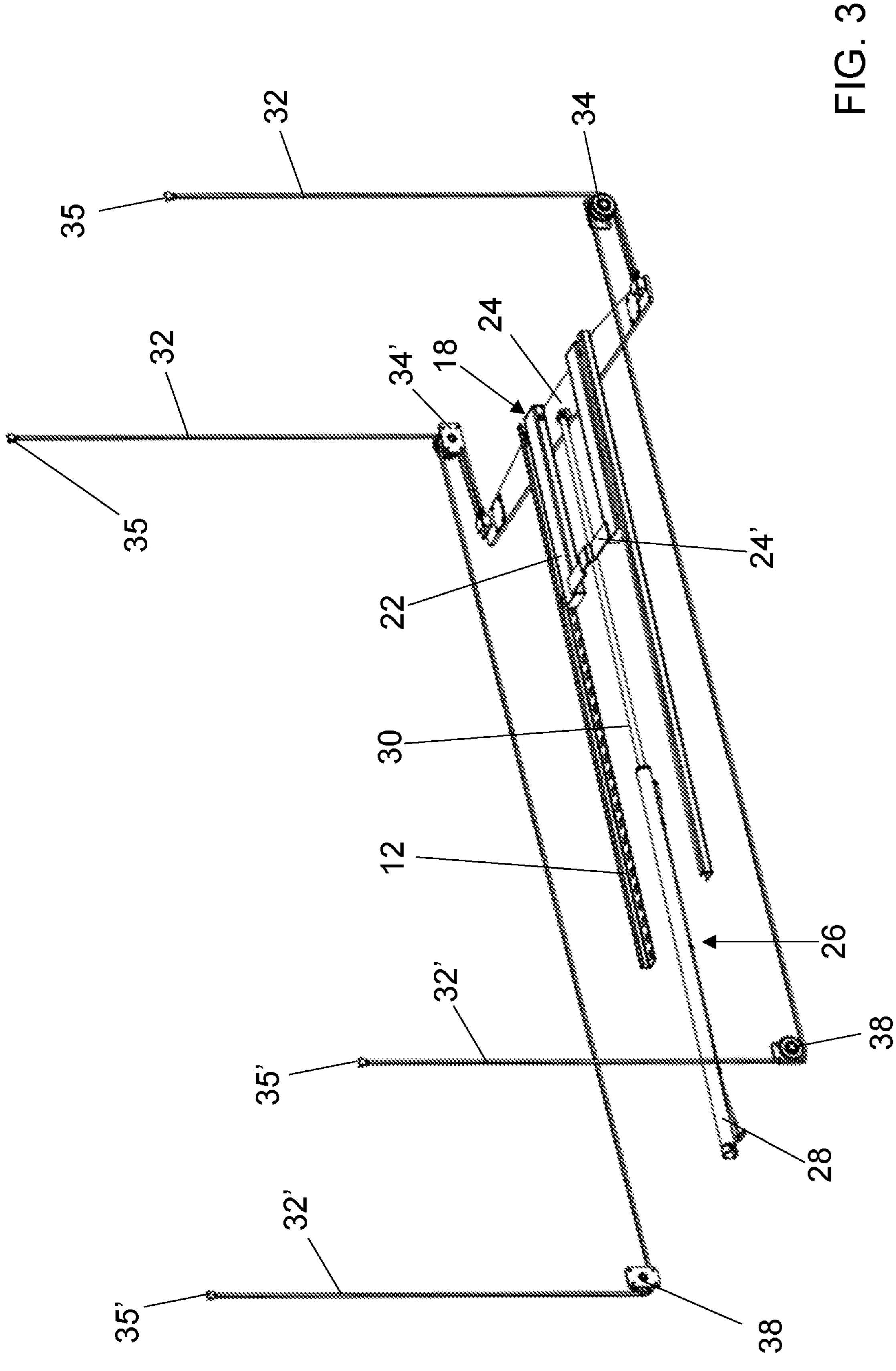
FIG. 3 shows in perspective view and in lowered condition only the vertical movement mechanism of the platform.
Figure 4:
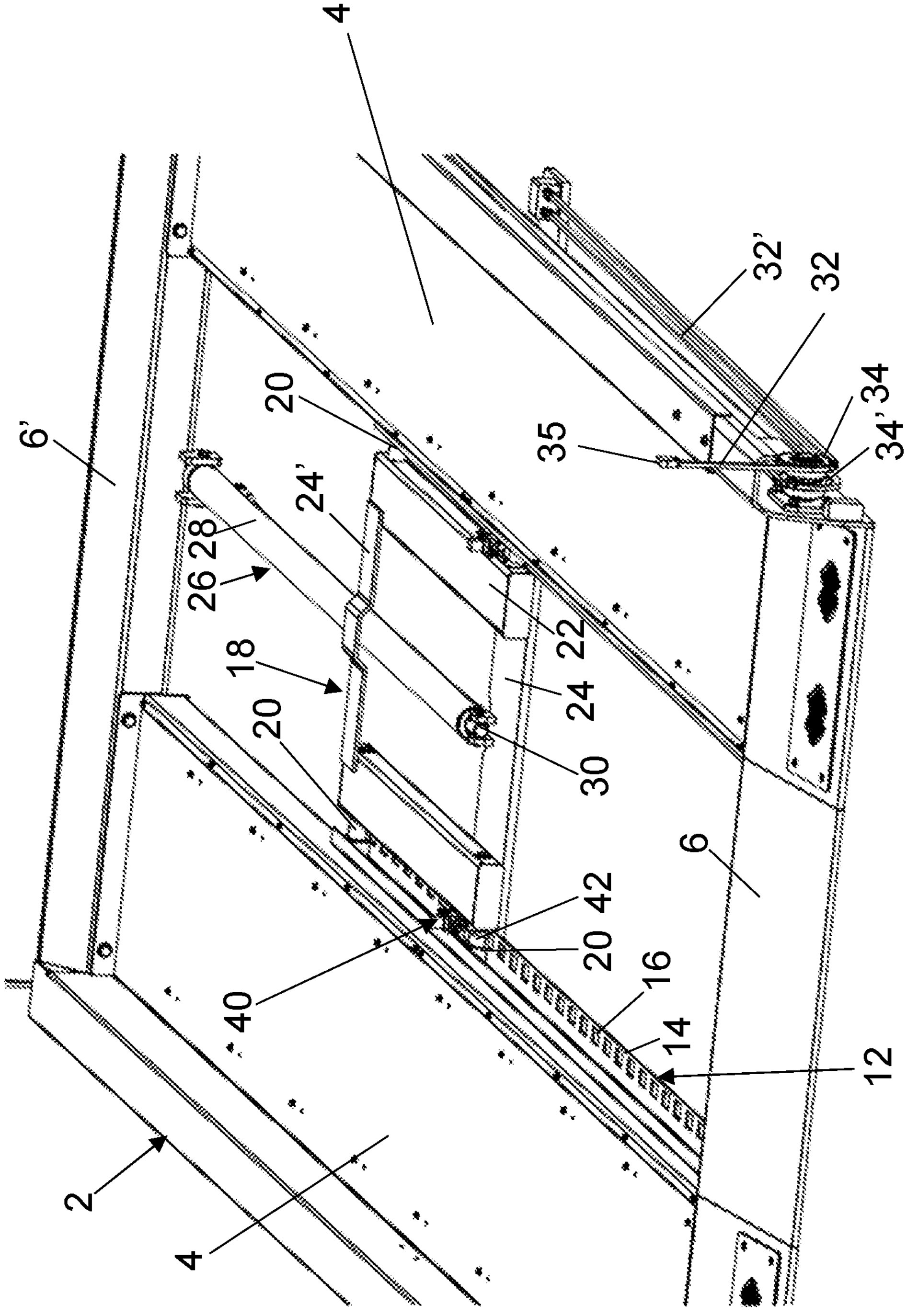
FIG. 4 shows in perspective view the detail of the safety locking device of the carriage that moves the chains of the mechanism lifting the platform bed.

As can be seen in FIGS. 1-4, the vertical movement platform for motor vehicles according to the invention comprises a rectangular platform 2 intended to accommodate a motor vehicle to be lifted (not shown).

The platform 2 is in practice constituted by a metal frame with two lanes 4, which are connected to each other by two crosspieces 6,6' and have a length, width and mutual distance such as to be able to accommodate motor vehicles having different wheelbases and different carriageways, and in this way make the platform suitable and be used practically with almost all traditional vehicles circulating on the road.

The crosspiece 6 placed on the side of access to the lanes 4 is configured in such a way as to constitute a sort of ramp for climbing the motor vehicle on the same lanes.

The vertical flange of a C-shaped section 12 is constrained to the inner side of each lane 4, for example by welding, which has the horizontal flanks facing inwards, i.e., towards the section 12 bound to the other lane 4.

The lower horizontal wing 14 of both sections 12 presents a plurality of rectangular openings 16 equidistant along the respective wing and equally positioned in the two wings.

As an alternative to the profiles fixed to the lanes 4, the invention also provides that said profiles can be obtained directly in the lanes by forming the sheet metal with which they are made.

The two sections 12 support and guide a carriage 18 provided with rollers 20 for supporting and idle sliding along the sections themselves. In the present description we will always speak of rollers 20, even if the invention provides that alternatively they can be suitably replaced by feet.

The carriage 18 comprises two side members 22 and two cross members 24,24', which connect the two side members 22 to each other. Two rollers 20 are constrained to each of the two side members 22 at both ends.

While the crosspiece 24', farther away from the ramp 6 ends in correspondence with the two side members 22, the crosspiece 24 closest to the ramp 6 extends beyond the two side members 22 below these and below the profiles 12 and the aisles 4, until it protrudes beyond the edge external of these.

The platform according to the invention also comprises an actuator for moving the carriage 18.

In the illustrated embodiment, the actuator consists of an oleodynamic jack 26, whose cylinder 28 is constrained with one end to the central section of the crosspiece 6' of the platform 2, i.e. of the crosspiece opposite to the crosspiece 6 configured as a ramp.

The rod 30 of the actuator 26 is constrained to the crosspiece 24 of the carriage 18 and for this reason the other crosspiece 24' of the carriage 18 is centrally shaped to avoid its interference with the rod itself.

To each of the two protruding ends of the crosspiece 24 a pair of chains 32,32' are fixed with one of their ends. One of these chains 32 runs parallel to the lanes 4, is deflected upwards by an idle pinion 34, applied to the outer edge of the lane 4 near the crosspiece 6 and is constrained with the other end to a fixed point 35 located in the upper end of a column 36 for guiding the platform 2 in its vertical movements.

In the example described and illustrated here, each guide column 36 is fixed to the floor, but it could also be fixed to the ceiling or to a wall or also to the floor and ceiling.

The chain 32' also runs in the initial section parallel to the lane 4 alongside the chain 32, but is then deflected by 180° by an idle pinion 34', coaxial with the pinion 34, up to the opposite end of the lane 4, where it is diverted upwards by another idle pinion 38, to then be constrained with the other end to a fixed point 35' located at the upper end of a guide column 36' of the other edge placed on the same side of the platform 2.

A safety device 40 is also applied to the external side of each of the two longitudinal members 22 of the carriage 18, in correspondence with the crosspiece 24, which comprises a pawl 42 articulated to the roller 20 and associated with an electromagnetic or hydraulic device, which with its activation/deactivation leads to the engagement/disengagement of the end of the pawl 42 in/from the opening 16 of the lower horizontal wing 14 of the section 12, which at that moment is facing or close to the end of the pawl itself.

For safety reasons it is preferable that a spring (not shown in the drawings) is associated with the pawl 42, which could act only by gravity once released, which, when the safety device 40 is deactivated, keeps the pawl 42 elastically engaged in the opening 16.

It is also envisaged that the guide columns 36 can also be affected by a plurality of openings 44, in which traditional safety devices (not shown) can engage, to realize the mechanical locking of the platform 2 at that moment reached along the guide columns 36.

The operation of the lifting platform according to the invention is as follows: when the platform 2 is on the ground and a motor vehicle has gone up through the ramp 6 onto the lanes 4, a command given by an operator or also by the same driver after getting out of the vehicle, activates the jack 26, which up to that moment was in the condition of maximum elongation.

As the jack 26 shortens, its rod 30 exerts a traction on the carriage 18, which slides along the sections 12 and moves away from the ramp 6, in turn exerting a traction on the chains 32,32', which with their transmissions at the pinions 34, 34', 38 cause the platform 2 and the motor vehicle placed thereon to be raised.

Moreover, the invention also provides that the jack 26 can act in compression rather than in traction.

The correct dimensioning of the quantities involved is such that the stroke of the carriage 18 stops when the platform 2 has reached the predetermined height, which generally corresponds to the upper end of the guide columns 36.

When the platform 2 has reached the end upper stroke, the deactivation command of the jack 26 also involves the deactivation of the safety devices, which allow the springs associated with the pawls 42 to make them engage the corresponding openings 16 of the sections 12, so as to obtain the mechanical locking of the platform 2 at the predetermined height.

If the platform according to the invention also provides for the use of mechanical safety devices acting on the guide columns 36, these lock the platform to the columns themselves and ensure that it is kept in its position even in the event of accidental breakage of one or more of the four chains 32, 32'.

When the platform 2 has been brought to the desired height, the space below it has become free and another motor vehicle can access it for parking.

From what has been said it is clear that the lifting platform according to the invention is much more advantageous than the traditional platforms intended for parking motor vehicles, and in particular:

- it is very simple to manufacture and in particular it can use only one actuator 26,
- it requires no connecting bar between the pinions 34,34', 38 for the return of the chains 32,32' placed on the two sides of the platform 2, unlike most of the traditional solutions, in which synchronization of the pinions is required to ensure regular lifting of the platform even in unbalanced load conditions,
- it is simple, safe and reliable to operate,
- it leaves the space underneath the raised platform 2 completely free,
- maximizes the space underneath the raised platform 2, since in this configuration the chains 32,32' are recalled by the movement of the carriage 18 inside the platform itself,
- ensures the stability of the position vertical operation of the platform 2 at any height regardless of possible fluid leaks from the hydraulic circuit due to seepage.

In the embodiment now illustrated, guide columns 36 are provided for the platform 2, but the platform could function equally well even in the absence of guide columns, with the chains 32,32' directly fixed with one end thereof to the ceiling.

Furthermore, in the illustrated embodiment an actuator constituted by a hydraulic jack has been shown, but the invention also includes the case of two or more hydraulic jacks placed side by side, which in this way can have a reduced cross-section and involve a smaller vertical encumbrance of the floor. Moreover, it is envisaged that the actuator may also be of a different type, and for example may consist of an electric motor integral with the platform

2 provided at the outlet with a worm screw engaged in a threaded bush integral with the carriage 18; and it is also provided that the actuator can be constituted by a gearmotor mounted on the carriage 18 and provided at the output of a pinion engaged in a longitudinal rack integral with the frame of the platform 2.

As an alternative to the carriage 18 with two longitudinal members 22 for guiding along the two sections 12 and two crosspieces 24,24' for connecting the two side members, the invention also provides carriages, in which the two side members 22 are connected to each other by means of a single crosspiece 24, to which the four ropes 32,32' are constrained in the way already seen.

The solution described above with all its variants is used, as we have seen, to receive a vehicle on the lanes 4 of the platform 2, when this is placed at a predetermined access level, and to then lift it so as to leave the space below free for another vehicle. A practically similar solution can also be advantageously used to lower the vehicle into a pit, so as to leave the access level free for the positioning of a new platform coming from an overlying level or for the positioning of a platform that translates laterally, traditional in itself, coming from a side-by-side parking unit, for example of the type used in so-called semi-automatic parking lots. These semi-automatic parking lots in fact consist of a plurality of side-by-side parking units, each comprising a platform according to the invention with a platform movable vertically between an access level for motor vehicles and an upper level or even a lower level (platform in pit); and in the case of a parking unit with a platform in the pit, the unit also comprises a platform that translates between adjacent units (not shown), suitable for receiving a motor vehicle to transfer it laterally from one unit to another. In this type of platform, its platform is provided with a movement system similar to that already described but provided with a different number of pinions for returning the chains 32,32', differently placed on the platform, so that this can be brought with the aisles 4 to the same level as the translating platform of an adjacent parking unit, even if the fixed anchorage points 35,35' of the chains are placed at a lower level.

In this type of platform, in fact, the fixed points 35,35', to which the chains 32,32' are fixed, must generally be placed at a lower level than the plane of the aisles 4 and the embodiment illustrated in FIGS. 1-4 it would not be validly usable.

Figure 5:
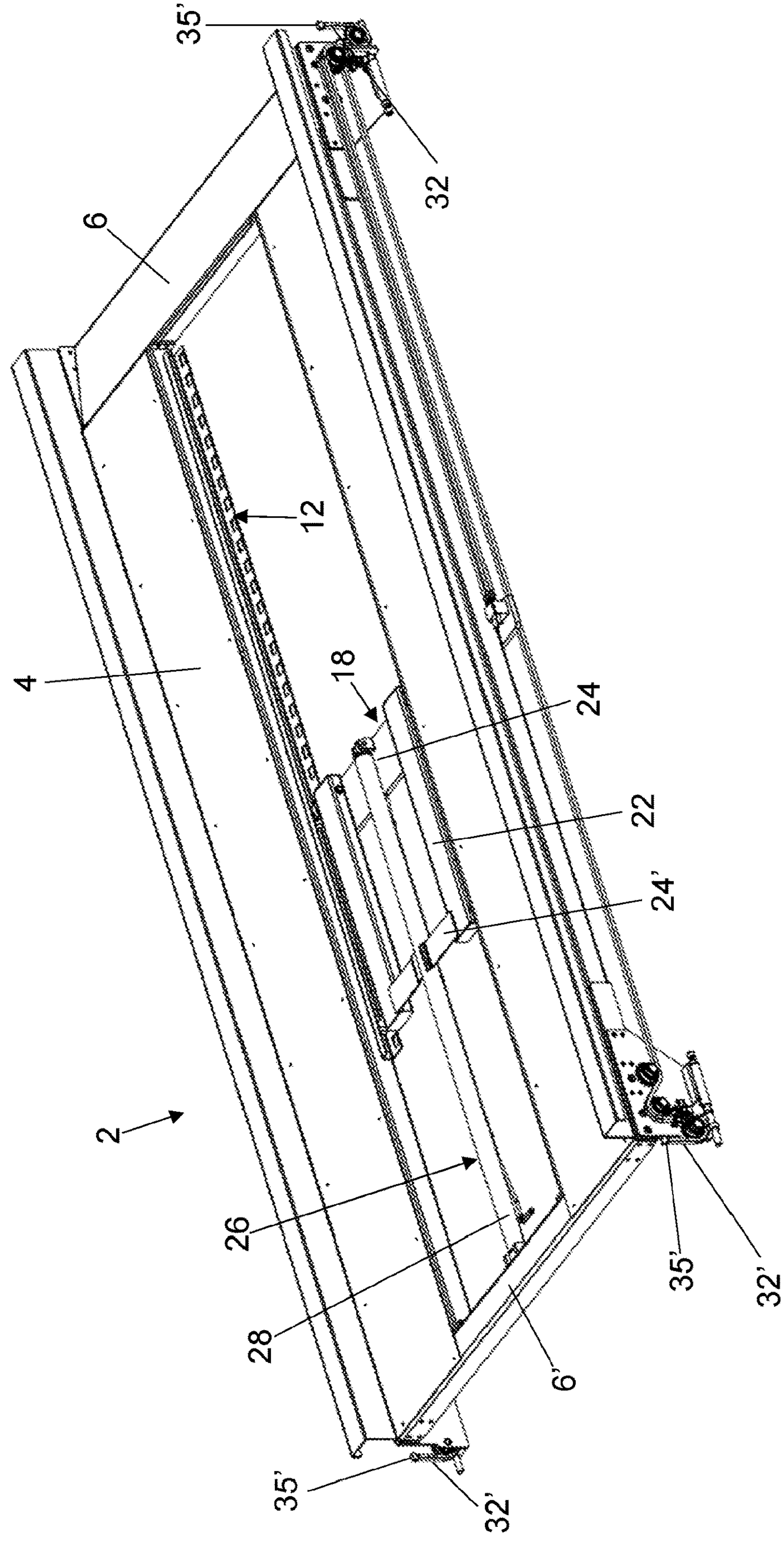
FIG. 5 shows a platform in a raised condition in a schematic perspective view and in a different embodiment used for installation in the pit.
Figure 6:
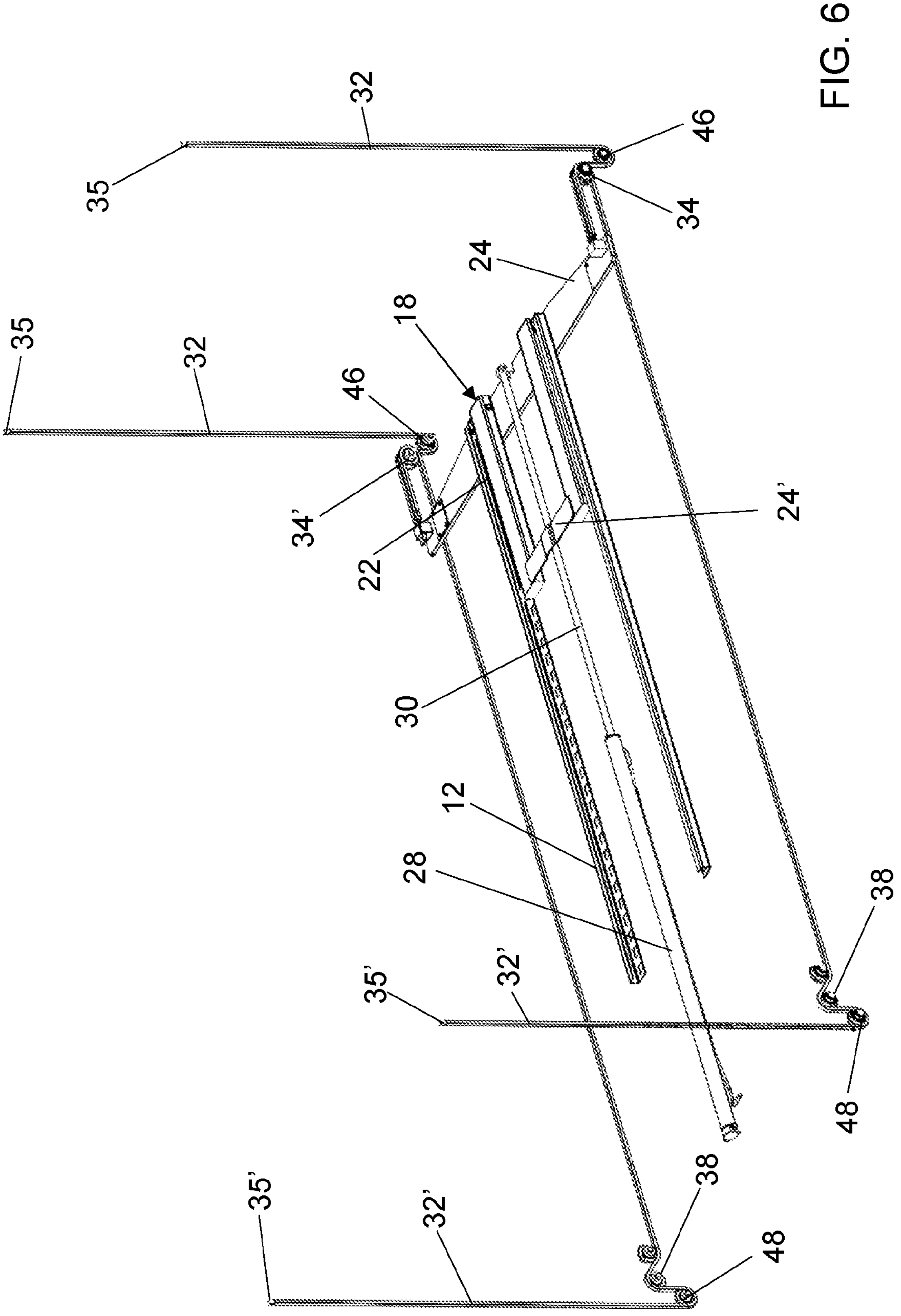
FIG. 6 shows the vertical movement mechanism of the platform in this embodiment in the same view as FIG. 3.
Figure 7:
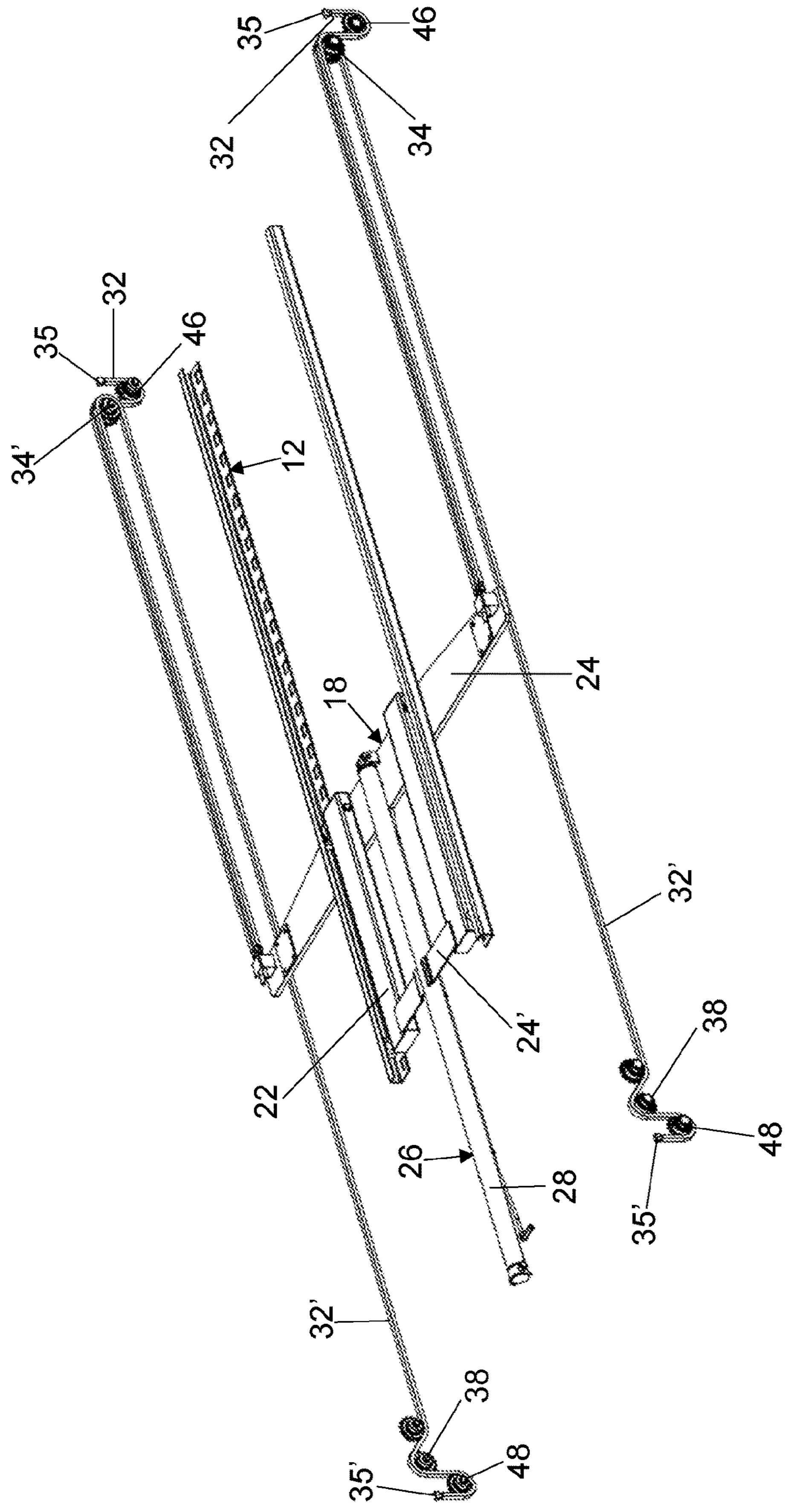
FIG. 7 shows the same mechanism with the platform in the raised condition.

To satisfy this need, the invention provides the embodiment illustrated in FIGS. 5-7, in which it can be seen that not a single pinion 34,34 is applied to each side of the platform 2, in correspondence with each crosspiece 6,6', 38', 38 for the return of each chain 32,32', as in the previous embodiment, but also a second pinion 46,48, which is interposed between the pinion 34,34', 38 and the corresponding fixed point 35,35' of the chain and is positioned at a lower level than the corresponding pinion 34, 34', 38. In this way it is possible to keep the plane of the lanes 4 at a higher level than the fixed points 35,35'.

As can be seen in fact in FIGS. 5-7, each chain 32 runs from one end of the crosspiece 24 with a first horizontal section up to the pinion 34, with a second section facing downwards from the pinion 34 to the pinion 46 and with a third section vertical upwards from the pinion 46 to the fixed point 35. Each chain 32' instead runs from the end of the crosspiece 24 with a first horizontal section up to the pinion 34', coaxial to the pinion 34, then with a second horizontal section but in opposite direction from pinion 34' to pinion 38, then with a third portion facing downwards from pinion 38 to pinion 48 and finally with a fourth vertical portion facing upwards from pinion 48 to fixed point 35'.

In this way the plane of the aisles 4 is placed above the level at which the fixed points 35,35' of constraint of one end of the chains 32,32' are found, a situation that would not be possible with a mechanism for moving the platform of the type shown in FIGS. 1-4.

The invention claimed is:

1. A lifting platform, for motor vehicles, comprising:
a platform for receiving a motor vehicle,
at least one actuator mounted on said platform,
at least two pairs of flexible traction elements, constrained with one end to fixed points and configured to be subjected to traction by said at least one actuator and thus cause the lifting of said platform,
return means, of said flexible traction elements,
a carriage, stably attached to said at least one actuator and sliding along longitudinal rails, which are fixed to said platform and are constituted by metal guide profiles of rollers, mounted idle on said carriage, or by runners, said metal guide profiles being provided with a horizontal sliding wing of said rollers or runners, presenting openings for engagement of locking devices applied to the carriage, to which the other end of said flexible traction elements is stably fixed, wherein said carriage comprises a crosspiece, which extends laterally up to a proximity of the two vertical planes delimiting each side of said platform and has, fixed at each of its ends, a pair of said flexible traction elements, of which a first flexible traction element runs with a first substantially horizontal section parallel to the sides of said platform and is deflected by a first return means to form a second vertical section having the upper end connected to one of said fixed points, while a second flexible traction element initially runs with a first substantially horizontal parallel to the first section of the first flexible traction element, is then deflected by a second return means to form a second substantially horizontal section, running substantially parallel to the first section of the first flexible traction element but in an opposite direction and is then deflected by a third return means to form a third vertical section having the upper end connected to the other of said fixed points.

2. The platform according to claim 1, wherein said actuator is of the hydraulic type and is placed in correspondence with a longitudinal axis of said platform.

3. The platform according to claim 1, wherein said actuator comprises an electric motor for driving a worm screw engaged in a threaded bush integral with said carriage.

4. The platform according to claim 1, wherein said flexible traction elements comprise chains and said transmission means comprise pinions.

5. The platform according to claim 1, wherein said flexible traction elements comprise cables or belts and said transmission means comprise pulleys or rollers.

6. The platform according to claim 1, wherein in correspondence with the raised condition of said platform said flexible traction elements are generally completely contained inside the platform.

7. The platform according to claim 1, wherein said platform comprises two lanes connected to each other by two crosspieces, at least one of which is configured as a ramp for an ascent of a motor vehicle on said lanes.

8. The platform according to claim 7, wherein said longitudinal rails are applied in correspondence with the internal side of said lanes.

9. The platform according to claim 1, further comprising four guide columns, along which said platform, said first and second fixed constraint points of said flexible traction elements being located near the upper end of said guide columns.

10. The platform according to claim 1, wherein said actuator comprises a gearmotor mounted on said carriage and provided at the outlet with a toothed wheel coupled with a rack integral with said platform.

11. The lifting platform according to claim 1, wherein a fourth return means is interposed between each first flexible traction element and its fixed point to deflect upwards said first flexible traction element, which was deflected downwards by said first return means, and wherein a fifth return means is interposed between each second flexible traction element and its fixed point, to deflect upwards said second flexible traction element, which was deflected downwards by said second return means.

12. A lifting platform, for motor vehicles, comprising:
a platform for receiving a motor vehicle,
at least one actuator mounted on said platform,
at least two pairs of flexible traction elements, constrained with one end to fixed points and configured to be subjected to traction by said at least one actuator and thus cause the lifting of said platform,
return means, of said flexible traction elements,
a carriage, stably attached to said at least one actuator and sliding along longitudinal rails, which are fixed to said platform and are constituted by metal guide profiles of rollers, mounted idle on said carriage, or by runners, said profiles being provided with a horizontal sliding wing of said rollers or shoes, presenting openings for engagement of locking devices applied to the carriage itself, to which the other end of said flexible traction elements is stably fixed, wherein said actuator comprises a gearmotor mounted on said carriage and provided at the outlet with a toothed wheel coupled with a rack integral with said platform; or an electric motor for driving a worm screw engaged in a threaded bush integral with said carriage.

13. A lifting platform, for motor vehicles, comprising:
a platform for receiving a motor vehicle,
at least one actuator mounted on said platform,
at least two pairs of flexible traction elements, constrained with one end to fixed points and configured to be subjected to traction by said at least one actuator and thus cause the lifting of said platform,
return means, of said flexible traction elements,
a carriage, stably attached to said at least one actuator and sliding along longitudinal rails, which are fixed to said platform and are constituted by metal guide profiles of rollers, mounted idle on said carriage, or by runners, said profiles being provided with a horizontal sliding wing of said rollers or shoes, presenting openings for engagement of locking devices applied to the carriage itself, to which the other end of said flexible traction elements is stably fixed, wherein said carriage comprises a crosspiece, which extends laterally beyond the edges of said platform and is stably fixed to each one end of said pairs of flexible traction elements, of which a first flexible traction element runs with a first substantially horizontal section parallel to the sides of said platform and is then deflected downwards by a first return means and upwards by a third return means to form a second vertical section, the upper end of which is constrained to one of said fixed points, while a second flexible traction element first runs with a first substantially horizontal section parallel to the first section of the first flexible traction element, is then deflected by a second transmission means to form a second substantially horizontal section running parallel to the first substantially horizontal section of the first flexible traction element but in the opposite direction, is then deflected downwards by a fourth return means and finally upwards by a fifth transmission to form a third vertical section, the upper end of which is constrained to the other of said fixed points.

14. The platform according to claim 13, wherein said first return means and second transmission means are coaxial.

15. The platform according to claim 13 wherein said first and second fixed points of constraint of one end of said flexible traction elements are placed at a level lower than a maximum height reachable from said platform.

16. The platform according to claim 13, wherein said first transmission means and second transmission means are coaxial.

* * * * *